United States Patent
Kwon et al.

(10) Patent No.: US 10,267,388 B2
(45) Date of Patent: Apr. 23, 2019

(54) PLANETARY GEAR TRAIN OF AN AUTOMATIC TRANSMISSION FOR A VEHICLE

(71) Applicants: HYUNDAI MOTOR COMPANY, Seoul (KR); KIA MOTORS CORPORATION, Seoul (KR)

(72) Inventors: Hyun Sik Kwon, Seoul (KR); Seongwook Ji, Gunpo-si (KR); Juhyeon Park, Suwon-si (KR); Ilhan Yoo, Seongnam-si (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 2 days.

(21) Appl. No.: 15/820,714

(22) Filed: Nov. 22, 2017

(65) Prior Publication Data

US 2019/0078650 A1    Mar. 14, 2019

(30) Foreign Application Priority Data

Sep. 13, 2017   (KR) .......................... 10-2017-0117416

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC ....................................................... F16H 3/66
See application file for complete search history.

(56) References Cited

U.S. PATENT DOCUMENTS

| | | | |
|---|---|---|---|
| 9,309,951 B1* | 4/2016 | Cho | F16H 3/66 |
| 9,746,054 B2* | 8/2017 | Mueller | F16H 3/66 |
| 2018/0087605 A1* | 3/2018 | Schoolcraft | F16H 3/66 |
| 2018/0087622 A1* | 3/2018 | Tryon | F16H 3/66 |
| 2018/0106334 A1* | 4/2018 | Horen | F16H 3/66 |

* cited by examiner

*Primary Examiner* — Derek D Knight
(74) *Attorney, Agent, or Firm* — Lempia Summerfield Katz LLC

(57) ABSTRACT

A planetary gear train may include input and output shafts, first to fourth planetary gear sets respectively having first to third, fourth to sixth, seventh to ninth, and tenth to twelfth elements, a first shaft connected with the ninth element and selectively connected with the input shaft, a second shaft connected with the twelfth element and selectively connected with the input shaft, a third shaft connected with the eighth and tenth elements and the output shaft, a fourth shaft connected with the first, fifth, and eleventh elements, a fifth shaft connected with the third, sixth, and seventh elements, and a plurality of additional shafts each selectively connecting a corresponding element to a transmission housing, the corresponding element being an element of the first or second planetary gear sets that is not interconnected.

11 Claims, 2 Drawing Sheets

FIG. 2

| Shift-stage | Engagement element | | | | | | Gear ratio |
|---|---|---|---|---|---|---|---|
| | C1 | C2 | C3 | C4 | B1 | B2 | |
| D1 |  | ● | ● |  | ● |  | 4.831 |
| D2 | ● |  | ● |  | ● |  | 3.090 |
| D3 | ● | ● |  |  | ● |  | 2.560 |
| D4 | ● |  |  |  | ● | ● | 1.769 |
| D5 | ● |  |  | ● | ● |  | 1.470 |
| D6 | ● |  |  | ● |  | ● | 1.151 |
| D7 | ● |  | ● | ● |  |  | 1.000 |
| D8 | ● |  | ● |  |  | ● | 0.749 |
| D9 | ● | ● |  |  |  | ● | 0.660 |
| D10 |  | ● | ● |  |  | ● | 0.541 |
| REV |  | ● |  | ● | ● |  | -2.118 |

PLANETARY GEAR TRAIN OF AN AUTOMATIC TRANSMISSION FOR A VEHICLE

CROSS-REFERENCE TO RELATED APPLICATION

This application claims priority to and the benefit of Korean Patent Application No. 10-2017-0117416 filed in the Korean Intellectual Property Office on Sep. 13, 2017, the entire contents of which are incorporated herein by reference.

BACKGROUND

(a) Field of the Disclosure

The present disclosure relates to automatic transmissions for vehicles. More particularly, the present disclosure relates to a planetary gear train of an automatic transmission of a vehicle.

(b) Description of the Related Art

Research on realizing more shift-stages of automatic transmissions has been conducted to enhance vehicle fuel consumption and drivability. Increasing oil prices have triggered fierce competition to enhance vehicle fuel consumption.

Research into weight reduction and enhanced fuel consumption through downsizing of an engine has been conducted. Research has also been conducted on automatic transmissions to simultaneously provide better drivability and fuel consumption by achieving more shift stages.

In order to achieve more shift stages for an automatic transmission, the number of parts is typically increased. As a result, this may deteriorate the installability, production cost, weight and/or power flow efficiency.

Eight-speed automatic transmissions have been recently introduced, and a planetary gear train for an automatic transmission enabling more shift stages is under investigation.

An automatic transmission of eight or more shift-stages typically includes three to four planetary gear sets and five to seven engagement elements (frictional elements). As a result, the automatic transmission may easily become lengthy, thereby deteriorating installability.

Disposing planetary gear sets in parallel or employing dog clutches instead of wet-type control elements has been attempted. However, such an arrangement may not be widely applicable, and using dog clutches may easily deteriorate shift-feel.

The above information disclosed in this Background section is only to enhance understanding of the background of the disclosure. Therefore, the background may contain information that is not prior art that is already known in this country to a person of ordinary skill in the art.

SUMMARY

The present disclosure relates to a planetary gear train of an automatic transmission for a vehicle. The disclosed planetary gear train enables at least ten forward speeds, thereby improving vehicle performance and fuel efficiency.

A planetary gear train according to an embodiment may include an input shaft for receiving an engine torque, an output shaft for outputting a shifted torque, a first planetary gear set having first, second, and third rotational elements, a second planetary gear set having fourth, fifth, and sixth rotational elements, a third planetary gear set having seventh, eighth, and ninth rotational elements, and a fourth planetary gear set having tenth, eleventh, and twelfth rotational elements. An exemplary planetary gear train may further include: a first shaft fixedly connected with the ninth rotational element and selectively connected with the input shaft; a second shaft fixedly connected with the twelfth rotational element and selectively connected with the input shaft; a third shaft fixedly connected with the eighth rotational element and the tenth rotational element, and fixedly connected with the output shaft; a fourth shaft fixedly connected with the first rotational element, the fifth rotational element, and the eleventh rotational element; a fifth shaft fixedly connected with the third rotational element, the sixth rotational element, and the seventh rotational element; and a plurality of additional shafts each selectively connecting a corresponding element to a transmission housing, the corresponding element being a rotational element of the first or second planetary gear sets that is not fixedly interconnected.

The plurality of additional shafts may include a sixth shaft fixedly connected with the second rotational element and selectively connected with the transmission housing, and a seventh shaft fixedly connected with the fourth rotational element and selectively connected with the transmission housing. The input shaft and the first shaft, the input shaft and the second shaft, the first shaft and the fourth shaft, and the second shaft and the seventh shaft may be selectively interconnected with each other respectively.

The exemplary planetary gear train may further include four clutches each selectively connecting a corresponding pair of shafts selected among the input shaft, the output shaft, and the first to seventh shafts. The exemplary planetary gear train may also include two brakes selectively connecting the sixth shaft and the seventh shaft to the transmission housing, respectively.

The four clutches may include a first clutch arranged between the input shaft and the first shaft, a second clutch arranged between the input shaft and the second shaft, a third clutch arranged between the first shaft and the fourth shaft, and a fourth clutch arranged between the second shaft and the seventh shaft. The two brakes may include a first brake arranged between the sixth shaft and the transmission housing, and a second brake arranged between the seventh shaft and the transmission housing.

The first planetary gear set may be a single pinion planetary gear set having a first sun gear, a first planet carrier, and a first ring gear as the first, second, and third rotational elements, respectively. The second planetary gear set may be a single pinion planetary gear set having a second sun gear, a second planet carrier, and a second ring gear as the fourth, fifth, and sixth rotational elements, respectively. The third planetary gear set may be a single pinion planetary gear set having a third sun gear, a third planet carrier, and a third ring gear as the seventh, eighth, and ninth rotational elements, respectively. The fourth planetary gear set may be a single pinion planetary gear set having a fourth sun gear, a fourth planet carrier, and a fourth ring gear as the tenth, eleventh, and twelfth rotational elements, respectively.

The first, second, third, and fourth planetary gear sets may be arranged in the order of the first, second, fourth, and third planetary gear sets from an engine side.

A planetary gear train according to an embodiment of the present disclosure may realize at least ten forward speeds and one reverse speed by combination of four planetary gear sets together with six engagement elements.

In addition, a planetary gear train according to an embodiment of the present disclosure may substantially improve driving stability by realizing shift-stages appropriate for the rotation speed of an engine due to multi-stages of an automatic transmission.

In addition, a planetary gear train according to an embodiment of the present disclosure may maximize engine driving efficiency by multi-stages of an automatic transmission. The planetary gear train according to an embodiment of the present disclosure may also improve power delivery performance and fuel consumption.

Further, effects that can be obtained or expected from embodiments of the present disclosure are directly or suggestively described in the detailed description below. In other words, various effects expected from embodiments of the present disclosure will be described in the detailed description below.

BRIEF DESCRIPTION OF THE DRAWINGS

FIG. 2 is an operational chart for respective control elements at respective shift-stages applicable to a planetary gear train according to an embodiment of the present disclosure.

DETAILED DESCRIPTION OF THE EMBODIMENTS

Figure 1:
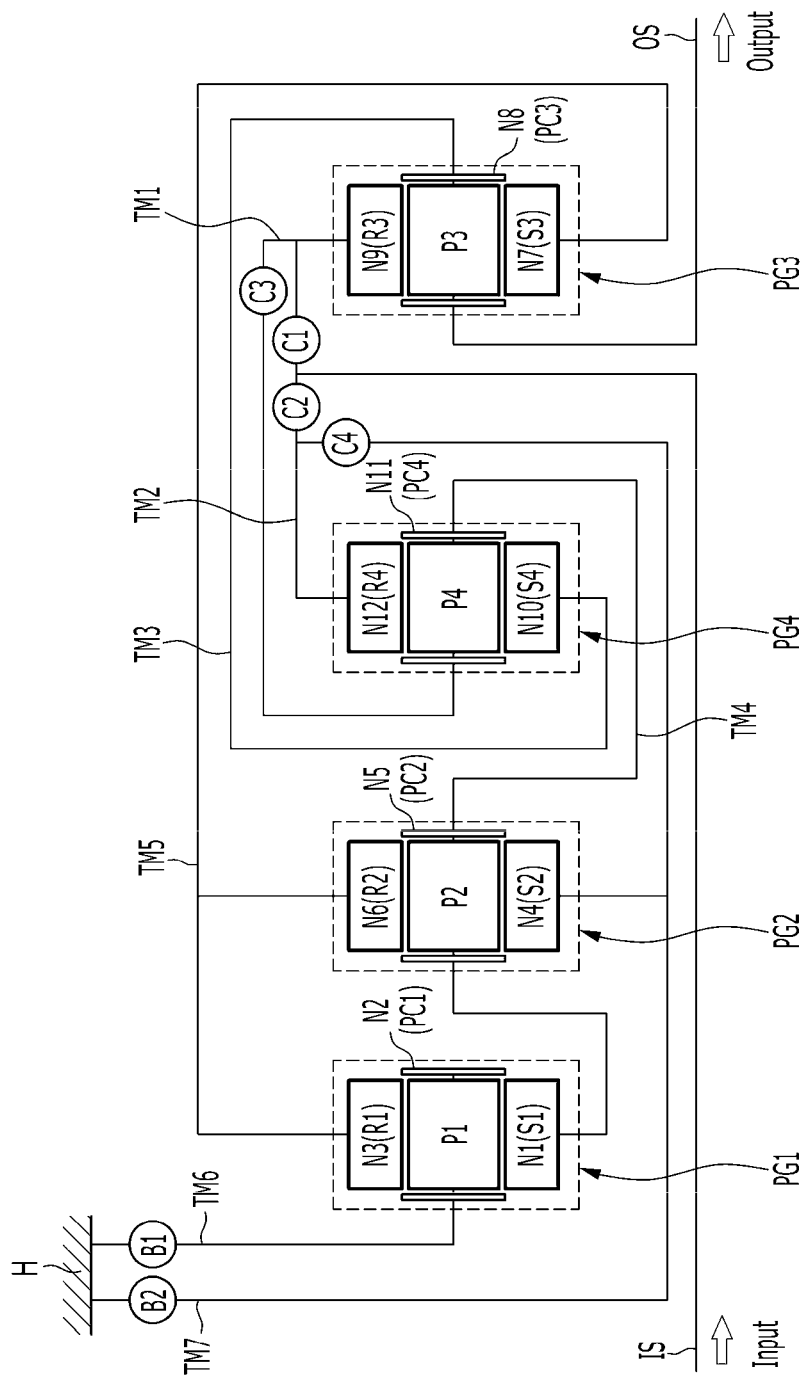
FIG. 1 is a schematic diagram of a planetary gear train according to an embodiment of the present disclosure.

It is desired to develop a planetary gear train capable of representing maximum efficiency by a small number of parts in order to increase fuel efficiency through multi-staging of speed changes or gear shifts. In one example, development of high efficiency automatic transmissions, which achieve at least ten forward speed stages, is desirable. In this aspect, the present disclosure relates to a planetary gear train of an automatic transmission for a vehicle. The disclosed planetary gear train may improve power delivery performance and reduce fuel consumption by implementing a speed change stage of at least ten forward speeds using a minimum number of parts.

Hereinafter, one embodiment of the present disclosure is described in detail with reference to drawings. In the drawings, the following symbols are used to identify various elements of the disclosed embodiments, wherein:
  i. B1, B2 represent first and second brakes;
  ii. C1, C2, C3, C4 represent first, second, third, and fourth clutches;
  iii. N1, N2, N3, N4, N5, N6, N7, N8, N9, N10, N11, N12 represent first, second, third, fourth, fifth, sixth, seventh, eighth, ninth, tenth, eleventh, and twelfth rotational elements;
  iv. PG1, PG2, PG3, PG4 represent first, second, third, and fourth planetary gear sets;
  v. S1, S2, S3, S4 represent first, second, third, and fourth sun gears;
  vi. PC1, PC2, PC3, PC4 represent first, second, third, and fourth planet carriers;
  vii. R1, R2, R3, R4 represent first, second, third, and fourth ring gears;
  viii. P1, P2, P3, P4 represent first, second, third, and fourth pinion gears;
  ix. IS represents an input shaft;
  x. OS represents an output shaft; and
  xi. TM1, TM2, TM3, TM4, TM5, TM6, TM7 represent first, second, third, fourth, fifth, sixth, and seventh shafts.

The drawings and description are to be regarded as illustrative in nature and not restrictive. Also, like reference numerals designate like elements throughout the specification.

In the following description, using names or terms to identify components such as first, second, third, and the like is to differentiate the names because the names of the components are otherwise the same as each other. Such a naming convention is not intended to denote or set an order thereof and the disclosure is not intended to be so limited.

FIG. 1 is a schematic diagram of a planetary gear train according to one embodiment of the present disclosure.

Referring to FIG. 1, a planetary gear train according to one embodiment of the present disclosure includes first, second, third, and fourth planetary gear sets PG1, PG2, PG3, and PG4 arranged on a same axis. In one embodiment, the planetary gear train also includes an input shaft IS, an output shaft OS, seven shafts TM1-TM7 interconnecting rotational elements of the first, second, third, and fourth planetary gear sets PG1, PG2, PG3, and PG4, engagement elements of four clutches C1-C4 and two brakes B1 and B2, and a transmission housing H.

Torque input from the input shaft IS is shifted by cooperative operation of the first, second, third, and fourth planetary gear sets PG1, PG2, PG3, and PG4. The shifted torque is then output through the output shaft OS.

In this embodiment, the planetary gear sets are arranged in the order of the first, second, fourth, and third planetary gear sets PG1, PG2, PG4, and PG3, from an engine side.

The input shaft IS is an input member and may receive a torque from a crankshaft of an engine through a torque converter.

The output shaft OS is an output member arranged on the same axis as the input shaft IS. The output shaft OS outputs a shifted driving torque to a driveshaft through a differential apparatus.

In this embodiment, the first planetary gear set PG1 is a single pinion planetary gear set. The first planetary gear set PG1 includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1 engaged with the first sun gear S1. The first sun gear S1 acts as a first rotational element N1, the first planet carrier PC1 acts as a second rotational element N2, and the first ring gear R1 acts as a third rotational element N3.

In this embodiment, the second planetary gear set PG2 is a single pinion planetary gear set. The second planetary gear set PG2 includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2 engaged with the second sun gear S2. The second sun gear S2 acts as a fourth rotational element N4, the second planet carrier PC2 acts as a fifth rotational element N5, and the second ring gear R2 acts as a sixth rotational element N6.

In this embodiment, the third planetary gear set PG3 is a single pinion planetary gear set. The third planetary gear set PG3 includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3 engaged with the third sun gear S3. The third sun gear S3 acts as a seventh rotational element N7, the third planet carrier PC3 acts as an eighth rotational element N8, and the third ring gear R3 acts as a ninth rotational element N9.

In this embodiment, the fourth planetary gear set PG4 is a single pinion planetary gear set. The fourth planetary gear set PG4 includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4 engaged with the fourth sun gear S4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 is fixedly connected with the fifth rotational element N5 and the eleventh rotational element N11, the third rotational element N3 is fixedly connected with the sixth rotational element N6 and the seventh rotational element N7, and the eighth rotational element N8 is fixedly connected with the tenth rotational element N10, thereby forming seven shafts TM1-TM7.

The seven shafts TM1-TM7 are described in further detail below.

In this embodiment, the first shaft TM1 is fixedly connected with the ninth rotational element N9 (third ring gear R3). The first shaft TM1 is also selectively connected with the input shaft IS, thereby selectively acting as an input element.

In this embodiment, the second shaft TM2 is fixedly connected with the twelfth rotational element N12 (fourth ring gear R4). The second shaft TM2 is also selectively connected with the input shaft IS, thereby selectively acting as an input element.

In this embodiment, the third shaft TM3 is fixedly connected with the eighth rotational element N8 (third planet carrier PC3) and the tenth rotational element N10 (fourth sun gear S4). The third shaft TM3 is also fixedly connected with the output shaft OS, thereby always acting as an output element.

In this embodiment, the fourth shaft TM4 is fixedly connected with the first rotational element N1 (first sun gear S1), the fifth rotational element N5 (second planet carrier PC2), and the eleventh rotational element N11 (fourth planet carrier PC4).

In this embodiment, the fifth shaft TM5 is fixedly connected with the third rotational element N3 (first ring gear R1), the sixth rotational element N6 (second ring gear R2), and the seventh rotational element N7 (third sun gear S3).

In this embodiment, the sixth shaft TM6 is fixedly connected with the second rotational element N2 (first planet carrier PC1).

In this embodiment, the seventh shaft TM7 is fixedly connected with the fourth rotational element N4 (second sun gear S2).

Each of the seven shafts TM1-TM7 may be a rotational member that fixedly interconnects the input and output shafts and rotational elements of the planetary gear sets PG1, PG2, PG3, and PG4. Each of the seven shafts TM1-TM7 may also be a rotational member that selectively interconnects a rotational element to the transmission housing H. Each of the seven shafts TM1-TM7 may also be a fixed member fixed to the transmission housing H.

In the disclosure, when two or more members are described as being "fixedly connected," where each of the two or more members may be any of a shaft, an input shaft, an output shaft, a rotational member, or a transmission housing, it means that the fixedly connected members always rotate at a same speed.

When two or more members are described as being "selectively connected" by an engagement element, it means that the selectively connected members rotate separately when the engagement element is not engaged, and rotate at a same speed when the engagement element is engaged. It may be understood that in the case that a member is "selectively connected" with a transmission housing by an engagement element, the member may be stationary when the engagement element is engaged.

In this embodiment, the first shaft TM1 is selectively connected with the input shaft IS, the second shaft TM2 is selectively connected with the input shaft IS, the first shaft TM1 is selectively connected with the fourth shaft TM4, and the second shaft TM2 is selectively connected with the seventh shaft TM7.

In this embodiment, the sixth shaft TM6 and the seventh shaft TM7 are selectively connected with the transmission housing H, thereby selectively acting as fixed elements, respectively.

In this embodiment, the engagement elements of the four clutches C1, C2, C3, and C4 are arranged between the seven shafts TM1-TM7, the input shaft IS, and the output shaft OS, so as to form selective connections.

The seven shafts TM1-TM7 may be selectively connected with the transmission housing H by control elements of two brakes B1 and B2.

The six engagement elements of the four clutches C1-C4 and the two brakes B1 and B2 are arranged as follows for this embodiment.

The first clutch C1 is arranged between the input shaft IS and the first shaft TM1. The first clutch C1 selectively connects the input shaft IS and the first shaft TM1, thereby controlling power delivery therebetween.

The second clutch C2 is arranged between the input shaft IS and the second shaft TM2. The second clutch C2 selectively connects the input shaft IS and the second shaft TM2, thereby controlling power delivery therebetween.

The third clutch C3 is arranged between the first shaft TM1 and the fourth shaft TM4. The third clutch C3 selectively connects the first shaft TM1 and the fourth shaft TM4, thereby controlling power delivery therebetween.

The fourth clutch C4 is arranged between the second shaft TM2 and the seventh shaft TM7. The fourth clutch C4 selectively connects the second shaft TM2 and the seventh shaft TM7, thereby controlling power delivery therebetween.

The first brake B1 is arranged between the sixth shaft TM6 and the transmission housing H. The first brake B1 selectively connects the sixth shaft TM6 to the transmission housing H.

The second brake B2 is arranged between the seventh shaft TM7 and the transmission housing H. The second brake B2 selectively connects the seventh shaft TM7 to the transmission housing H.

The engagement elements of the first, second, third, and fourth clutches C1, C2, C3, and C4 and the first and second brakes B1 and B2 may be multi-plate hydraulic pressure friction devices that are frictionally engaged by hydraulic pressure. However, it should be understood that the engagement elements are not to be limited thereto, since various other configurations that are electrically controllable may be available.

FIG. 2 is an operational chart for respective control elements at respective shift-stages applicable to a planetary gear train according to an embodiment of the present disclosure.

Referring to FIG. 2, a planetary gear train according to an embodiment of the present disclosure realizes shifting between ten forward speeds and one reverse speed by operating three elements among the engagement elements of the first, second, third, and fourth clutches C1, C2, C3, and C4 and the first and second brakes B1 and B2.

In this embodiment, in the forward first speed D1, the second and third clutches C2 and C3 and the first brake B1 are simultaneously operated.

As a result, the second shaft TM2 is connected with the input shaft IS by the operation of the second clutch C2, and the first shaft TM1 is connected with the fourth shaft TM4 by the operation of the third clutch C3. In this state, a torque is input to the second shaft TM2.

In addition, the sixth shaft TM6 acts as a fixed element by the operation of the first brake B1, thereby realizing the forward first speed D1 and outputting a shifted torque to the output shaft OS connected with the third shaft TM3.

In this embodiment, in the forward second speed D2, the first and third clutches C1 and C3 and the first brake B1 are simultaneously operated.

As a result, the first shaft TM1 is connected with the input shaft IS by the operation of the first clutch C1, and the first shaft TM1 is connected with the fourth shaft TM4 by the operation of the third clutch C3. In this state, the input torque is input to the first shaft TM1.

In addition, the sixth shaft TM6 acts as a fixed element by the operation of the first brake B1, thereby realizing the forward second speed D2 and outputting a shifted torque to the output shaft OS connected with the third shaft TM3.

In this embodiment, in the forward third speed D3, the first and second clutch C1 and C2 and the first brake B1 are simultaneously operated.

As a result, the first shaft TM1 is connected with the input shaft IS by the operation of the first clutch C1, and the second shaft TM2 is connected with the input shaft IS by the operation of the second clutch C2. In this state, an input torque is input to the first shaft TM1.

In addition, the sixth shaft TM6 acts as a fixed element by the operation of the first brake B1, thereby realizing the forward third speed D3 and outputting a shifted torque to the output shaft OS connected with the third shaft TM3.

In this embodiment, in the forward fourth speed D4, the first clutch C1 and the first and second brakes B1 and B2 are simultaneously operated.

As a result, the first shaft TM1 is connected with the input shaft IS by the operation of the first clutch C1, and an input torque is input to the first shaft TM1.

In such a state, the sixth and seventh shafts TM6 and TM7 act as fixed elements by the operation of the first and second brakes B1 and B2, thereby realizing the forward fourth speed D4 and outputting a shifted torque to the output shaft OS connected with the third shaft TM3.

In this embodiment, in the forward fifth speed D5, the first and fourth clutches C1 and C4 and the first brake B1 are simultaneously operated.

As a result, the first shaft TM1 is connected with the input shaft IS by the operation of the first clutch C1, and the second shaft TM2 is connected with the seventh shaft TM7 by the operation of the fourth clutch C4. In this state, an input torque is input to the first shaft TM1.

In addition, the sixth shaft TM6 acts as a fixed element by the operation of the first brake B1, thereby realizing the forward fifth speed D5 and outputting a shifted torque to the output shaft OS connected with the third shaft TM3.

In this embodiment, in the forward sixth speed D6, the first and fourth clutches C1 and C4 and the second brake B2 are simultaneously operated.

As a result, the first shaft TM1 is connected with the input shaft IS by the operation of the first clutch C1, and the second shaft TM2 is connected with the seventh shaft TM7 by the operation of the fourth clutch C4. In this state, an input torque is input to the first shaft TM1.

In addition, the seventh shaft TM7 acts as a fixed element by the operation of the second brake B2, thereby realizing the forward sixth speed D6 and outputting a shifted torque to the output shaft OS connected with the third shaft TM3.

In this embodiment, in the forward seventh speed D7, the first, third, and fourth clutches C1, C3, and C4 are simultaneously operated.

As a result, the first shaft TM1 is connected with the input shaft IS by the operation of the first clutch C1, the first shaft TM1 is connected with the fourth shaft TM4 by the operation of the third clutch C3, and the second shaft TM2 is connected with the seventh shaft TM7 by the operation of the fourth clutch C4.

In this arrangement, the first, second, third, and fourth planetary gear sets PG1, PG2, PG3, and PG4 integrally rotate, and a torque is input to the first shaft TM1, thereby realizing the forward seventh speed D7, where a torque is output as inputted, and outputting a shifted torque to the output shaft OS connected with the third shaft TM3.

In this embodiment, in the forward eighth speed D8, the first and third clutches C1 and C3 and the second brake B2 are simultaneously operated.

As a result, the first shaft TM1 is connected with the input shaft IS by the operation of the first clutch C1, and first shaft TM1 is connected with the fourth shaft TM4 by the operation of the third clutch C3. In this state, the input torque is input to the first shaft TM1.

In addition, the seventh shaft TM7 acts as a fixed element by the operation of the second brake B2, thereby realizing the forward eighth speed D8 and outputting a shifted torque to the output shaft OS connected with the third shaft TM3.

In this embodiment, in the forward ninth speed D9, the first and second clutch C1 and C2 and the second brake B2 are simultaneously operated.

As a result, the first shaft TM1 is connected with the input shaft IS by the operation of the first clutch C1, and the second shaft TM2 is connected with the input shaft IS by the operation of the second clutch C2. In this state, a torque is input to the first and second shafts TM1 and TM2.

In addition, the seventh shaft TM7 acts as a fixed element by the operation of the second brake B2, thereby realizing the forward ninth speed D9 and outputting a shifted torque to the output shaft OS connected with the third shaft TM3.

In this embodiment, in the forward tenth speed D10, the second and third clutches C2 and C3 and the second brake B2 are simultaneously operated.

As a result, the second shaft TM2 is connected with the input shaft IS by the operation of the second clutch C2, and first shaft TM1 is connected with the fourth shaft TM4 by the operation of the third clutch C3. In this state, the input torque is input to the second shaft TM2.

In addition, the seventh shaft TM7 acts as a fixed element by the operation of the second brake B2, thereby realizing the forward tenth speed D10 and outputting a shifted torque to the output shaft OS connected with the third shaft TM3.

In this embodiment, in the reverse speed REV, the second and fourth clutches C2 and C4 and the first brake B1 are simultaneously operated.

As a result, the second shaft TM2 is connected with the input shaft IS by the operation of the second clutch C2, and the second shaft TM2 is connected with the seventh shaft TM7 by the operation of the fourth clutch C4. In this state, a torque is input to the second shaft TM2.

In addition, the sixth shaft TM6 acts as a fixed element by the operation of the first brake B1, thereby realizing the reverse speed REV and outputting a shifted torque to the output shaft OS connected with the third shaft TM3.

As described above, a planetary gear train according to one embodiment of the present disclosure may realize ten forward speeds and one reverse speed by operating the four planetary gear sets PG1, PG2, PG3, and PG4 and by controlling the four clutches C1, C2, C3, and C4 and the two brakes B1 and B2.

In addition, a planetary gear train according to an embodiment of the present disclosure may substantially improve driving stability by realizing shift-stages appropriate for rotation speeds of an engine due to multi-stages of an automatic transmission.

In addition, a planetary gear train according to an embodiment of the present disclosure may maximize engine driving efficiency by multi-stages of an automatic transmission. The disclosed planetary gear train may also improve power delivery performance and fuel consumption.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   an input shaft for receiving an engine torque;
   an output shaft for outputting a shifted torque;
   a first planetary gear set having a first, a second, and a third rotational element;
   a second planetary gear set having a fourth, a fifth, and a sixth rotational element;
   a third planetary gear set having a seventh, an eighth, and a ninth rotational element;
   a fourth planetary gear set having a tenth, an eleventh, and a twelfth rotational element;
   a first shaft fixedly connected with the ninth rotational element and selectively connected with the input shaft;
   a second shaft fixedly connected with the twelfth rotational element and selectively connected with the input shaft;
   a third shaft fixedly connected with the eighth rotational element, the tenth rotational element, and the output shaft;
   a fourth shaft fixedly connected with the first rotational element, the fifth rotational element, and the eleventh rotational element;
   a fifth shaft fixedly connected with the third rotational element, the sixth rotational element, and the seventh rotational element; and
   a plurality of additional shafts, wherein each of the plurality of additional shafts selectively connects a corresponding element to a transmission housing, the corresponding element being a rotational element of the first or second planetary gear sets that is not fixedly interconnected.

2. The planetary gear train of claim 1, wherein the plurality of additional shafts comprises:
   a sixth shaft fixedly connected with the second rotational element and selectively connected with the transmission housing; and
   a seventh shaft fixedly connected with the fourth rotational element and selectively connected with the transmission housing,
   wherein the input shaft and the first shaft, the input shaft and the second shaft, the first shaft and the fourth shaft, and the second shaft and the seventh shaft are selectively interconnected with each other, respectively.

3. The planetary gear train of claim 2, further comprising:
   four clutches each selectively connecting a corresponding pair of shafts, the corresponding pair of shafts selected among the input shaft, the output shaft, and the first to seventh shafts; and
   two brakes selectively connecting the sixth shaft and the seventh shaft to the transmission housing, respectively.

4. The planetary gear train of claim 3, wherein the four clutches comprise:
   a first clutch arranged between the input shaft and the first shaft;
   a second clutch arranged between the input shaft and the second shaft;
   a third clutch arranged between the first shaft and the fourth shaft; and
   a fourth clutch arranged between the second shaft and the seventh shaft, and
   wherein the two brakes comprise:
   a first brake arranged between the sixth shaft and the transmission housing; and
   a second brake arranged between the seventh shaft and the transmission housing.

5. The planetary gear train of claim 1, wherein:
   the first planetary gear set is a single pinion planetary gear set having a first sun gear, a first planet carrier, and a first ring gear as the first, second, and third rotational elements, respectively,
   the second planetary gear set is a single pinion planetary gear set having a second sun gear, a second planet carrier, and a second ring gear as the fourth, fifth, and sixth rotational elements, respectively,
   the third planetary gear set is a single pinion planetary gear set having a third sun gear, a third planet carrier, and a third ring gear as the seventh, eighth, and ninth rotational elements, respectively, and
   the fourth planetary gear set is a single pinion planetary gear set having a fourth sun gear, a fourth planet carrier, and a fourth ring gear as the tenth, eleventh, and twelfth rotational elements, respectively.

6. The planetary gear train of claim 1, wherein the first, second, third, and fourth planetary gear sets are arranged in the order of the first, second, fourth, and third planetary gear sets from an engine side.

7. A planetary gear train of an automatic transmission for a vehicle, the planetary gear train comprising:
   an input shaft for receiving an engine torque;
   an output shaft for outputting a shifted torque;
   a first planetary gear set having a first, a second, and a third rotational element;
   a second planetary gear set having a fourth, a fifth, and a sixth rotational element;

a third planetary gear set having a seventh, an eighth, and a ninth rotational element; and a fourth planetary gear set having a tenth, an eleventh, and a twelfth rotational element, wherein the first rotational element is fixedly connected with the fifth rotational element and the eleventh rotational element, the second rotational element is selectively connected with the transmission housing, the third rotational element is fixedly connected with the sixth rotational element and the seventh rotational element, the fourth rotational element is selectively connected with the transmission housing, the eighth rotational element is fixedly connected with the tenth rotational element and the output shaft, the ninth rotational element is selectively connected with the eleventh rotational element and the input shaft, respectively, and the twelfth rotational element is selectively connected with the fourth rotational element and the input shaft.

8. The planetary gear train of claim 7, further comprising:

four clutches each selectively connecting a corresponding pair of shafts, the corresponding pair of shafts selected among the input shaft, the output shaft, and the rotational elements; and two brakes selectively connecting the second rotational element and the fourth rotational element to the transmission housing, respectively.

9. The planetary gear train of claim 8, wherein the four clutches comprise:

a first clutch arranged between the input shaft and the ninth rotational element;

a second clutch arranged between the input shaft and the twelfth rotational element;

a third clutch arranged between the ninth rotational element and the eleventh rotational element; and a fourth clutch arranged between the fourth rotational element and the twelfth rotational element, and wherein the two brakes comprise:

a first brake arranged between the second rotational element and the transmission housing; and a second brake arranged between the fourth rotational element and the transmission housing.

10. The planetary gear train of claim 7, wherein:

the first planetary gear set is a single pinion planetary gear set having a first sun gear, a first planet carrier, and a first ring gear as the first, second, and third rotational elements, respectively, the second planetary gear set is a single pinion planetary gear set having a second sun gear, a second planet carrier, and a second ring gear as the fourth, fifth, and sixth rotational elements, respectively, the third planetary gear set is a single pinion planetary gear set having a third sun gear, a third planet carrier, and a third ring gear as the seventh, eighth, and ninth rotational elements, respectively, and the fourth planetary gear set is a single pinion planetary gear set having a fourth sun gear, a fourth planet carrier, and a fourth ring gear as the tenth, eleventh, and twelfth rotational elements, respectively.

11. The planetary gear train of claim 7, wherein the first, second, third, and fourth planetary gear sets are arranged in the order of the first, second, fourth, and third planetary gear sets from an engine side.

* * * * *